United States Patent
Varlet

(10) Patent No.: US 6,316,547 B1
(45) Date of Patent: Nov. 13, 2001

(54) MASTERBATCH COMPOSITION

(75) Inventor: Jean-Luc Patrick Varlet, Uccle (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/508,443

(22) PCT Filed: Sep. 8, 1998

(86) PCT No.: PCT/US98/18884

§ 371 Date: Mar. 9, 2000

§ 102(e) Date: Mar. 9, 2000

(87) PCT Pub. No.: WO99/12997

PCT Pub. Date: Mar. 18, 1999

(30) Foreign Application Priority Data

Sep. 11, 1997 (EP) .................................................. 97202794

(51) Int. Cl.[7] .............................. C08F 8/00; C08L 23/00; C08L 23/04; C08J 3/22

(52) U.S. Cl. ............................................. 525/191; 525/240

(58) Field of Search ...................................... 525/191, 240

(56) References Cited

U.S. PATENT DOCUMENTS

| | | |
|---|---|---|
| 4,510,271 * | 4/1985 | Muhle et al. ........................ 523/346 |
| 4,521,437 | 6/1985 | Storms . |
| 4,810,733 * | 3/1989 | Sakuma et al. ...................... 523/206 |
| 5,227,366 | 7/1993 | Swatling et al. . |
| 5,604,066 * | 2/1997 | Foucher et al. ...................... 430/106 |
| 5,604,279 * | 2/1997 | Bernhardt et al. . |
| 5,782,344 | 7/1998 | Edwards . |
| 6,015,235 | 1/2000 | Kraimer . |
| 6,063,462 | 5/2000 | Tsukamoto . |

FOREIGN PATENT DOCUMENTS

| | | |
|---|---|---|
| 3437116 | 5/1985 | (DE) . |
| 19548788 | 7/1994 | (DE) . |
| 0304185 | 6/1997 | (JP) . |
| WO 95/00587 | 1/1995 | (WO) . |
| WO 95/05426 | 2/1995 | (WO) . |
| WO 96/12762 | 5/1996 | (WO) . |
| WO 97/06221 | 2/1997 | (WO) . |
| WO 97/19991 | 6/1997 | (WO) . |

* cited by examiner

Primary Examiner—Nathan M. Nutter
(74) Attorney, Agent, or Firm—Thibault Fayette; Jerry Yetter; Jeffrey V. Bamber

(57) ABSTRACT

The present invention related to an improved coloration process for thermoplastic resins using a masterbatch containing pigments. The masterbatch composition is comprising a metallocene catalyzed resin as a carrier for the pigment, so as to improve the affinity between the thermoplastic resin and the pigment to provide a better dispersion.

24 Claims, No Drawings

MASTERBATCH COMPOSITION

TECHNICAL FIELD

The invention relates to a process for coloration of plastic resins.

BACKGROUND OF THE INVENTION

Coloration of plastic resins is usually achieved using a masterbatch. A masterbatch is a granular, usually dust free colorant composition comprising substantially high concentrations of pigment. This masterbatch is normally added to a thermo-plastic resin, which is normally in granular form also, prior to processing of the mixture, by extrusion or injection for example.

The reason for using the masterbatch technique is that direct coloration with pigments raises issues due to poor dispersion. The masterbatch is also used for minimising the risk of abrasion of the extruders. Indeed, the pigments will tend to cover the surface of the processing apparatus without having a good dispersion within the resin itself.

The present invention relates to a process for coloration of a thermoplastic resin comprising the step of mixing the thermoplastic resin in a granular form with a colorant composition comprising pigments to form a granular mixture, the colorant composition being in the granular form during mixing.

Existing masterbatch or granular colorant compositions may comprise the pigments together with a carrier. The role of the carrier is to enhance the affinity of the pigment with the thermo-plastic resin for coloration and to improve the dispersion and mixing of the colorant composition with the resin.

Such compositions are disclosed in various documents. EP-A-0 751 171 published on the $2^{nd}$ of Jan. 1997 describes a colorant composition whereby the carrier is comprising poly-olefins and poly-acrylate-ester. A different composition is proposed in U.S. Pat. No. 5,604,279 granted on the $18^{th}$ of Feb. 1997, whereby the colorant composition also comprises poly-olefins together with a free flow agent. Such compositions should facilitate dispersion of the pigment within the final product. However, these colorant compositions are not compatible with all polymers, and for example have a poor affinity with polypropylene.

Consequently, it is an object of the present invention to provide a coloration process allowing better dispersion of pigments in a thermoplastic resin.

SUMMARY OF THE INVENTION

The present invention provides a process in a manner to satisfy the aforementioned needs.

The process of the invention has the mixing step characterised in that the colorant composition comprises a metallocene catalysed resin.

DETAILED DESCRIPTION OF THE INVENTION

The colorant composition of the invention for a masterbatch comprises pigments. The pigments are the colouring agent. They are comprised in a masterbatch because mixing them directly with a thermo-plastic resin may be difficult due to a low affinity. Once the pigments are integrated in a masterbatch, usually together with a carrier, the masterbatch can be mixed with the thermo-plastic resin for coloration. Normally, mixing occurs when the masterbatch and the thermo-plastic resin are in a granular state. The word "resin" refers to a family of materials which can be processed to be in granular form or in liquid form. It is a feature of the process of the present invention that the resin is used in a granular form. The pigments used may be organic or inorganic pigments. A colorant composition usually contains between 15% to 90% by weight, preferably 20% to 80%, more preferably 40% to 60%, most preferably 45% to 55%, of pigments.

Other ingredients may be added to a colorant composition, among which a carrier. Preferably, a colorant composition contains between 8% to 85% by weight, preferably 18% to 80%, more preferably 18% to 60%, most preferably 43% to 55%, of carrier. Other additives may be used, such as anti-oxydant, lubricating agents, surface tension reducers or agents facilitating labelling. Such additives may be contained between 0% to 2% by weight in the colorant composition.

In traditional colorant composition, the carrier may be poly-ethylene, preferably low density poly-ethylene because of its lubricating properties, preferably poly-propylene when the masterbatch is for mixing with a poly-propylene thermoplastic, or for example poly-styrene. Indeed the choice of the carrier often depends on the thermo-plastic resin to be coloured.

The colorant composition of the invention comprises a metallocene catalysed resin. Indeed, it was found that a metallocene catalysed resin would significantly improve the homogenisation and dispersion of the pigment in the mixture. Because of the improvement in the masterbatch dispersion, a more uniform phase can be obtained. Consequently, less pigment may be used. Indeed it is an object of the present invention to reduce material costs, in particular pigment costs, while maintaining coloration quality. This objective can be obtained when introducing the metallocene catalysed resins, which differ from, for example, the Ziegler-Natta catalysed resin, in that the molecular weight distribution of metallocene catalysed resins is narrower. The molecular weight distribution is defined here as $M_w/M_n$, whereby $M_w$ is the weight average molecular weight and $M_n$ is the number average molecular weight. A molecular weight distribution of metallocene catalysed resins is typically of less than 3.5, especially from 1.5 to 2.5, whereas the molecular weight distribution of Ziegler-Natta catalysed resin is typically of more than 3.5, most typically of more than 5.

The process of the invention is particularly useful for the coloration of thermoplastic resins when the thermoplastic resins to be coloured are made using a Ziegler Natta catalysis. Indeed such resins can be manufactured at low cost, while they can be coloured in an improved manner if using the colorant composition according to the process of the invention. In the case of a coloration of thermoplastic resins which comprise metallocene catalysed resins prior to the mixing step, coloration will be improved further if the colorant composition also comprises metallocene catalysed resins according to the invention.

Various kinds of metallocene catalysed resins may be used in the colorant composition. Such resins comprise poly-olefins, preferably poly-ethylene or poly-propylene. The choice of the resin to use may depend on the thermoplastic resin which should be coloured. For example, metallocene catalysed poly-propylene will have an excellent affinity for mixing with a poly-propylene resin to be coloured.

Once the mixing of the masterbatch with the thermoplastic resin to be coloured is achieved, the mixture may be processed in different ways. Processes which can be used include injection moulding, blow moulding or injection stretch blow moulding.

In a preferred embodiment of the invention, the thermoplastic resin to be coloured is a poly-propylene. The thermoplastic resin to be coloured may be another poly-olefin such as poly-ethylene. The thermo-plastic resin to be coloured may also be a blend of different materials. The metallocene used in the colorant composition is a poly-ethylene, which has a good affinity with poly-propylene. The metallocene catalysed resin may be used to replace completely the traditional carrier such as low density poly-ethylene, or may replace it partially only. Preferably, a colorant composition contains between 8% to 85% by weight, preferably 5% to 70%, more preferably 10% to 60%, even more preferably 15% to 40% and most preferably 20% to 30%, of metallocene catalysed resin. The mixture prepared in the preferred embodiment of the invention may be used for example for injection moulding of a cap for a container, or for blow moulding of a bottle. Such a poly-propylene cap would be particularly suitable for co-operating with a container for containing consumer goods, whereby the coloration of the product allows recognition by the consumer. Indeed, it is a further object of this invention to obtain good quality colouring. This can be achieved while controlling the costs as the metallocene catalysed resin is present in the granular mixture preferably in the proportion of 0.1% to 10% by weight of the mixture, more preferably between 0.1% and 8%, most preferably between 0.2% and 2%. The thermoplastic resin to be coloured may also comprise metallocene catalysed resins which would not be coming from the masterbatch, in which case the proportion of metallocene catalysed resins in the mixture may be higher, and may exceed the total weight of the masterbatch itself.

The addition of metallocene resin to the masterbatch does not only ease coloration and does not only have aesthetic consequences on the final mixture, but also has consequences on the mechanical properties of the object obtained after processing of the mixture. Indeed, because the pigment has a better dispersion, thus allowing a better crystallisation, the object obtained shows an improved stress cracking resistance, which is a further advantage given by the invention. This aspect of the invention is particularly useful if the object is in contact with a chemically aggressive composition such as an oxidising composition, for example. This particularly applies to packaging of products such as bleach containing compositions.

The example which follows explains the invention:

EXAMPLE

The masterbatch of the example is made of a granular colorant composition comprising 80% by weight of pigments and up to 20% by weight of metallocene catalysed polyethylene having a molecular weight distribution of less than 3.5. The masterbatch can also include additional materials that do not affect its essential character, for instance stabilizers, processing aids such as waxes, deodorizing agents, anti-static agents, anti-blocking agents, plasticizers and the like.

The granular thermoplastic resin for coloration is made of Ziegler-Natta catalysed polypropylene having a density of 0.9 g/cm$^3$.

The thermoplastic resin in the granular form is mixed with the masterbatch in the granular form to obtain the granular mixture. In this example, the granular mixture is composed of 4% by weight of the granular colorant composition composing the masterbatch and of 96% by weight of the thermoplastic resin. The granular mixture is subsequently injected to obtain the coloured object desired.

What is claimed is:

1. A method of coloring a thermoplastic resin, said method comprising:
   providing a thermoplastic resin in a granular form;
   providing a colorant composition in a granular form wherein said colorant composition comprises pigments and a metallocene catalyzed resin;
   mixing said granular thermoplastic resin with said granular colorant composition to form a granular mixture; and
   applying heat to said mixture whereby said pigments disperse in said mixture, such that a uniform phase is obtained.

2. The method of claim 1 wherein said thermoplastic resin is a poly-olefin.

3. The method of claim 2 wherein said thermoplastic is a poly-propylene.

4. The method of claim 1 wherein said granular mixture comprises 0.1% to 10% by weight of metallocene catalyzed resin.

5. The method of claim 1 wherein said colorant composition comprises 20% to 80% by weight of pigments and 1% to 80% by weight of a metallocene catalyzed resin.

6. The method of claim 1 wherein said metallocene catalyzed resin is a metallocene catalyzed polyolefin.

7. The method of claim 6 wherein said metallocene catalyzed polyolefin is a metallocene catalyzed polyethylene.

8. A method of making a colored container for storing a chemically aggressive composition comprising:
   providing a thermoplastic resin in a granular form;
   providing a colorant composition in a granular form wherein said colorant composition comprises pigments and a metallocene catalyzed resin;
   mixing said granular thermoplastic resin with said granular colorant composition to form a mixture; and
   forming a container with said mixture whereby said metallocene catalyzed resin substantially improves the homogenization and dispersion of said pigments in said mixture when the container is formed.

9. The method of claim 8 wherein said container is formed by blow moulding process.

10. The method of claim 8 wherein said metallocene catalyzed resin is a metallocene catalyzed polyolefin.

11. The method of claim 10 wherein said metallocene catalyzed polyolefin is a metallocene catalyzed polyethylene.

12. The method of claim 8 wherein said colorant composition further comprises an additive.

13. The method of claim 12 wherein said colorant composition comprises 15% to 90% by weight of pigments, 8% to 85% by weight of metallocene catalyzed resin and up to 2% by weight of additive.

14. The method of claim 12 wherein said additive is selected from the group consisting of anti-oxidant agent, lubricating agent, surface tension reducer, facilitating labeling agent, stabilizer agent, waxing agent, deodorizing agent, anti-static agent, anti-blocking agent and plasticizer agent.

15. A method of making a colored closure for a container used for storing a chemically aggressive composition comprising:
   providing a thermoplastic resin in a granular form;
   providing a colorant composition in a granular form wherein said colorant composition comprises pigments and a metallocene catalyzed resin;

mixing said granular thermoplastic resin with said granular colorant composition to form a mixture; and forming a closure with said mixture such that said metallocene catalyzed resin substantially improves the homogenization and dispersion of said pigments in said mixture when the container is formed.

16. The method of claim 15 wherein said closure is formed by injection moulding process.

17. The method of claim 15 wherein said metallocene catalyzed resin is a metallocene catalyzed polyolefin.

18. The method of claim 17 wherein said metallocene catalyzed polyolefin is a metallocene catalyzed polyethylene.

19. The method of claim 15 wherein said colorant composition further comprises an additive.

20. The method of claim 19 wherein said colorant composition comprises 15% to 90% by weight of pigments, 8% to 85% by weight of metallocene catalyzed resin and up to 2% by weight of additive.

21. The method of claim 19 wherein said additive is selected from the group consisting of anti-oxidant agent, lubricating agent, surface tension reducer, facilitating labeling agent, stabilizer agent, waxing agent, deodorizing agent, anti-static agent, anti-blocking agent and plasticizer agent.

22. A colored container made according to claim 8 further containing a chemically aggressive liquid composition.

23. The colored container of claim 22 wherein said chemically aggressive liquid composition is a bleach containing composition.

24. A container having a chemically aggressive liquid composition therein, said container being fitted with a colored closure made according to claim 15.

* * * * *